United States Patent
Park et al.

(10) Patent No.: US 11,312,852 B2
(45) Date of Patent: Apr. 26, 2022

(54) METHOD FOR PREPARING GRAFT COPOLYMER COMPLEX, GRAFT COPOLYMER COMPLEX, AND THERMOPLASTIC RESIN COMPOSITION COMPRISING GRAFT COPOLYMER COMPLEX

(71) Applicant: LG CHEM, LTD., Seoul (KR)

(72) Inventors: Sang Hoo Park, Daejeon (KR); Seok Goo Jang, Daejeon (KR); Hye Jeong Ok, Daejeon (KR); Ho Hoon Kim, Daejeon (KR); Hyung Seop Shim, Daejeon (KR); Jeong Su Choi, Daejeon (KR); Keun Hoon Yoo, Daejeon (KR); Won Seok Lee, Daejeon (KR); Roo Da Lee, Daejeon (KR); Jong Ju Lee, Daejeon (KR)

(73) Assignee: LG CHEM, LTD., Seoul (KR)

( * ) Notice: Subject to any disclaimer, the term of this patent is extended or adjusted under 35 U.S.C. 154(b) by 477 days.

(21) Appl. No.: 16/463,830

(22) PCT Filed: Oct. 2, 2018

(86) PCT No.: PCT/KR2018/011696
§ 371 (c)(1),
(2) Date: May 23, 2019

(87) PCT Pub. No.: WO2019/078514
PCT Pub. Date: Apr. 25, 2019

(65) Prior Publication Data
US 2019/0382575 A1   Dec. 19, 2019

(30) Foreign Application Priority Data

Oct. 18, 2017  (KR) ................... 10-2017-0135288

(51) Int. Cl.
| C08F 220/14 | (2006.01) |
| C08L 33/06 | (2006.01) |
| C08F 279/06 | (2006.01) |
| C08J 3/07 | (2006.01) |
| C08K 5/3472 | (2006.01) |

(52) U.S. Cl.
CPC .......... *C08L 33/064* (2013.01); *C08F 279/06* (2013.01); *C08J 3/07* (2013.01); *C08K 5/3472* (2013.01)

(58) Field of Classification Search
CPC ........ C08L 33/064; C08L 25/12; C08L 33/12; C08L 25/14; C08L 51/003; C08F 279/06; C08F 6/22; C08F 220/14; C08F 2/06; C08F 2/26; C08F 2/38; C08F 279/02; C08F 8/30; C08F 2/22; C08J 3/07; C08K 5/3472; C08K 2201/017; C08K 5/3445
USPC .......................................... 523/335
See application file for complete search history.

(56) References Cited

U.S. PATENT DOCUMENTS

| 4,284,737 | A | 8/1981 | Kruse et al. |
| 8,093,317 | B2 | 1/2012 | Matsuda et al. |
| 9,926,444 | B2 | 3/2018 | Choi et al. |
| 2009/0030122 | A1 | 1/2009 | Matsuda et al. |
| 2016/0326362 | A1* | 11/2016 | Oh ............................ C08F 6/22 |
| 2017/0260384 | A1 | 9/2017 | Choi et al. |

FOREIGN PATENT DOCUMENTS

| CN | 101374905 A | 2/2009 |
| CN | 105283481 A | 1/2016 |
| CN | 105462006 A | 4/2016 |
| CN | 105764983 A | 7/2016 |
| EP | 3118258 A1 | 1/2017 |
| JP | 2006205465 A | 8/2006 |
| JP | 2010209218 A | 9/2010 |
| KR | 20020042857 A | 6/2002 |
| KR | 20120093429 A | 8/2012 |
| KR | 20130056507 A | 5/2013 |
| KR | 20160068295 A | 6/2016 |

OTHER PUBLICATIONS

Search Report and Written Opinion for European Application No. 18868328.8, dated Apr. 6, 2020.
Tamas Oncsik et al., "Charging and aggregation of latex particles in aqueous solutions of ionic liquids: towards an extended Hofmeister series", Phys. Chem. Chem. Phys., Feb. 9, 2016, pp. 7511-7520, vol. 18.
International Search Report issued in related PCT/KR2018/011696 dated Jan. 10, 2019.
Galimberti, M. et al., "Multifunctional Use of Ionic Liquids in Natural Rubber Based Compounds" Rubber World, 2015, vol. 253, No. 2, pp. 29-33.

* cited by examiner

*Primary Examiner* — Hannah J Pak

(57) ABSTRACT

The present invention relates to a method for preparing a graft copolymer complex, a copolymer complex prepared by the method, and a thermoplastic resin composition comprising the copolymer complex, wherein the method comprises emulsion-polymerizing a conjugated diene-based polymer, an aromatic vinyl-based monomer, and an alkyl (meth)acrylate-based monomer to prepare a graft copolymer latex; and adding an imidazole-based ionic compound to the graft copolymer latex and coagulating the same.

14 Claims, No Drawings

METHOD FOR PREPARING GRAFT COPOLYMER COMPLEX, GRAFT COPOLYMER COMPLEX, AND THERMOPLASTIC RESIN COMPOSITION COMPRISING GRAFT COPOLYMER COMPLEX

CROSS-REFERENCE TO RELATED APPLICATION

The present application is a U.S. National Stage of International Application No. PCT/KR2018/011696, filed Oct. 2, 2018, which claims priority to and the benefit of Korean Patent Application No. 10-2017-0135288, filed on Oct. 18, 2017, the disclosures of which are incorporated herein by reference in their entirety.

TECHNICAL FIELD

The present invention relates to a method for preparing a graft copolymer complex, a graft copolymer complex, and a thermoplastic resin composition comprising the graft copolymer complex, and more particularly, to a method for preparing a graft copolymer complex exhibiting an excellent antistatic property, excellent transparency, and excellent impact strength and a low yellow index, a graft copolymer complex, and a thermoplastic resin composition comprising the graft copolymer complex.

BACKGROUND ART

Recently, as the industry has advanced and differentiation of products has been actively promoted, product designs have been greatly changed, colors have been diversified, and a transparent design has attracted much attention. Changes in design require changes in materials, whereby research into the development of transparent materials is actively underway. Thereamong, a transparent ABS resin has an extremely high light transmittance and excellent transparency. In addition, the transparent ABS resin has excellent impact resistance, processability, and mechanical properties, thereby being applied to electric and electronic fields, OA equipment, miscellaneous goods, and construction materials.

However, since materials having transparency have excellent electrical insulation due to an electric resistance of about $10^{15}$ to $10^{20}$ Ω·cm, due to electrostatic charging, serious problems may often be caused. For example, upon rubbing or stripping of overlapping films, tens of thousands of volts can be easily charged, which may cause an electric shock to an operator or fire. In addition, in the case of general injection-molded articles, dust is frequently attached to the appearance of a product, thereby deteriorating appearance. Accordingly, there is a problem that dust attached to a product surface during long-term storage should be wiped.

As examples of trouble due to such static electricity generation, there are damage to electrical and electronic equipment due to ignition and explosion of a flammable gas and liquid caused by discharge of charged static electricity, e.g., damage to semiconductor devices, damage to magnetic recording media, a decrease in product value due to dust adsorption, work productivity loss, etc.

As methods of addressing such problems, there are a method of adding inorganic compounds such as carbon black, a metal powder, a metal fiber, and a hygroscopic inorganic material and a method of leaking charged static electricity using a surfactant.

However, inorganic compounds added to prepare a resin cause a decrease in impact strength of the resin, poor product appearance, and a decrease in colorability. In addition, since the method of using a surfactant requires a separate coating process, processing costs and time increase, and a surfactant is carbonized and deposited on a surface of a mold over time upon molding a resin.

DISCLOSURE

Technical Problem

Therefore, the present invention has been made in view of the above problems, and it is one object of the present invention to provide a method for preparing a graft copolymer complex not only having an excellent antistatic property, but also excellent transmittance, excellent impact strength, and an excellent yellow index, a graft copolymer complex, and a thermoplastic resin composition comprising the graft copolymer complex.

Technical Solution

In accordance with an aspect of the present invention, the above and other objects can be accomplished by the provision of a method for preparing a graft copolymer complex, comprising; emulsion-polymerizing a conjugated diene-based polymer, an aromatic vinyl-based monomer, and an alkyl (meth)acrylate-based monomer to prepare a graft copolymer latex; and an imidazole-based ionic compound to the graft copolymer latex and coagulating the same.

In accordance with another aspect of the present invention, there is provided a graft copolymer complex comprising a graft copolymer comprising a conjugated diene-based polymer and units derived from an aromatic vinyl-based monomer and units derived from an alkyl (meth)acrylate-based monomer graft-polymerized with the conjugated diene-based polymer; and a compound derived from an imidazole-based ionic compound.

In accordance with yet another aspect of the present invention, there is provided a thermoplastic resin composition comprising the graft copolymer complex; and a copolymer comprising units derived from an alkyl (meth)acrylate, units derived from an aromatic vinyl-based monomer, and units derived from an α,β-unsaturated nitrile-based monomer.

Advantageous Effects

Since a copolymer complex prepared according to a method of the present invention is prepared by adding an imidazole-based ionic compound during a coagulation process of a graft copolymer latex, the imidazole-based ionic compound can be uniformly included therein without damage to basic properties of a graft copolymer. Accordingly, due to the imidazole-based ionic compound, an antistatic property of a graft copolymer complex can be remarkably improved and the graft copolymer complex can exhibit excellent transparency and impact strength and a low yellow index.

BEST MODE FOR CARRYING OUT THE INVENTION

Hereinafter, the present invention will be described to facilitate understanding of the present invention Terms or words used in the specification and the following claims shall not be limited to common or dictionary meanings, and have meanings and concepts corresponding to technical aspects of the embodiments of the present invention so as to most suitably express the embodiments of the present invention.

In the present invention, a graft copolymer refers to a structure wherein a copolymer comprising units derived from an aromatic vinyl-based monomer, units derived from an alkyl (meth)acrylate-based monomer, and the like is grafted and bonded to a conjugated diene-based polymer.

1. Graft Copolymer Complex Preparation Method

A method for preparing a graft copolymer complex according to an embodiment of the present invention includes (1) emulsion-polymerizing a conjugated diene-based polymer, an aromatic vinyl-based monomer, and an alkyl (meth)acrylate-based monomer to prepare a graft copolymer latex; and (2) adding an imidazole-based ionic compound to the graft copolymer latex and coagulating the same.

Hereinafter, each step of the method for preparing a graft copolymer complex according to an embodiment of the present invention is described in more detail.

(1) Preparation of Graft Copolymer Latex

First, a conjugated diene-based polymer, an aromatic vinyl-based monomer, and an alkyl (meth)acrylate-based monomer are emulsion-polymerized, thereby preparing a graft copolymer latex.

The conjugated diene-based polymer may be one or more selected from the group consisting of a butadiene polymer, a butadiene-styrene copolymer, a butadiene-acrylonitrile copolymer, an ethylene-propylene copolymer, and derivatives thereof. Thereamong, a butadiene polymer is preferred. The conjugated diene-based polymer may have a structure wherein a double bond and a single bond are alternately arranged.

The conjugated diene-based polymer may participate in emulsion polymerization in a diene-based rubber latex form wherein a conjugated diene-based rubber polymer prepared by polymerizing a conjugated diene-based polymer is dispersed in water in a colloidal state.

The conjugated diene-based polymer may be included in an amount of 20 to 70% by weight, 30 to 60% by weight, or 40 to 60% by weight based on a total weight of the conjugated diene-based polymer, the aromatic vinyl-based monomer, and the alkyl (meth)acrylate-based monomer. Thereamong, an amount of 40 to 60% by weight is preferred. Within these ranges, a thermoplastic resin composition, as a final product, may exhibit superior impact resistance, processability, and transparency.

The aromatic vinyl-based monomer may be one or more selected from the group consisting of styrene, α-methylstyrene, p-methylstyrene, and vinyl toluene. Thereamong, styrene is preferred.

The aromatic vinyl-based monomer may be included in an amount of 7 to 30% by weight, 10 to 30% by weight, or 10 to 20% by weight based on a total weight of the conjugated diene-based polymer, the aromatic vinyl-based monomer, and the alkyl (meth)acrylate-based monomer. Thereamong, an amount of 10 to 20% by weight is preferred. Within these ranges, a thermoplastic resin composition, a final product, may exhibit superior transparency.

The alkyl (meth)acrylate-based monomer may be one or more selected from the group consisting of methyl (meth)acrylate, ethyl (meth)acrylate, propyl (meth)acrylate, 2-ethylhexyl (meth)acrylate, decyl (meth)acrylate, and lauryl (meth)acrylate. Thereamong, methyl methacrylate is preferred.

The alkyl (meth)acrylate-based monomer may be included in an amount of 20 to 60% by weight, 30 to 60% by weight, or 30 to 40% by weight based on a total weight of the conjugated diene-based polymer, the aromatic vinyl-based monomer, and the alkyl (meth)acrylate-based monomer. Thereamong, an amount of 30 to 40% by weight is preferred. Within these ranges, a thermoplastic resin composition, as a final product, may exhibit superior transparency.

During the emulsion polymerization, an α,β-unsaturated nitrile-based monomer may be further added. The α,β-unsaturated nitrile-based monomer may be one or more selected from the group consisting of acrylonitrile, methacrylonitrile, phenylacrylonitrile, and α-chloroacrylonitrile. Thereamong, acrylonitrile is preferred.

The α,β-unsaturated nitrile-based monomer may be included in an amount of 10 parts by weight or less, 1 to 10 parts by weight, 2 to 7 parts by weight, or 2 to 5 parts by weight based on 100 parts by weight of the sum of the conjugated diene-based polymer, the aromatic vinyl-based monomer, and the alkyl (meth)acrylate-based monomer. Thereamong, an amount of 2 to 5 parts by weight is preferred.

When the amount of the α,β-unsaturated nitrile-based monomer is within these ranges, chemical resistance may be further improved without deterioration of transparency of a final product.

The emulsion polymerization may be graft emulsion polymerization and may be performed at 50 to 85° C. or 60 to 80° C. Thereamong, a temperature of 60 to 80° C. is preferred.

The emulsion polymerization may be performed in the presence of an initiator and an emulsifier.

The initiator may be one or more radical initiators selected from the group consisting of inorganic peroxides such as sodium persulfate, potassium persulfate, ammonium persulfate, potassium perphosphate, and hydrogen peroxide; organic peroxides such as t-butyl peroxide, cumene hydroperoxide, p-menthane hydroperoxide, di-t-butyl peroxide, t-butylcumyl peroxide, acetyl peroxide, isobutyl peroxide, octanoyl peroxide, dibenzoyl peroxide, 3,5,5-trimethylhexanol peroxide, and t-butyl peroxy isobutyrate; and azo compounds such as azobis(isobutyronitrile), azobis-2,4-dimethylvaleronitrile, azobis(cyclohexanecarbonitrile), and azobis (isobutyric acid methyl).

An activator may be further added along with the initiator so as to facilitate an initiation reaction. The activator may be one or more selected from the group consisting of sodium formaldehyde sulfoxylate, sodium ethylene diaminotetraacetate, ferrous sulfate, dextrose, sodium pyrophosphate, sodium pyrophosphate anhydrous, and sodium sulfate.

The initiator may be added in an amount of 0.001 to 1.0 part by weight, 0.01 to 0.5 part by weight or 0.02 to 0.1 part by weight based on 100 parts by weight of the sum of the conjugated diene-based polymer, the aromatic vinyl-based monomer, and the alkyl (meth)acrylate-based monomer. Thereamong, an amount of 0.02 to 0.1 part by weight is preferred. Within these ranges, emulsion polymerization may be easily performed, and a residual amount of an initiator in a graft copolymer may be minimized.

The emulsifier may be one or more selected from the group consisting of a sodium compound of an alkylbenzenesulfonate, a potassium compound of an alkylbenzenesulfonate, a potassium compound of an alkylcarboxylate, a sodium compound of an alkylcarboxylate, a potassium compound of oleic acid, a sodium compound of oleic acid, a sodium compound of an alkylsulfate, a potassium compound of an alkylsulfate, a sodium compound of an alkyldicarboxylate, a potassium compound of an alkyldicarboxylate, a sodium compound of an alkylethersulfonate, a potassium compound of an alkylethersulfonate, a sodium compound of an alkylethersulfate, a potassium compound of an alkylethersulfate, and an ammonium compound of an allyloxynonylphenoxypropane-2-yloxymethylsulfate. Thereamong, sodium dodecylbenzenesulfonate, as a sodium compound of an alkylbenzenesulfonate, is preferred.

As the emulsifier, a commercially available material may be used. In this case, one or more selected from the group consisting of SE10N, BC-10, BC-20, HS10, Hitenol KH10, and PD-104 may be used.

The emulsifier may be added in an amount of 0.15 to 2.0 parts by weight, 0.3 to 1.5 parts by weight, or 0.5 to 1.2 parts by weight based on 100 parts by weight of the sum of the conjugated diene-based polymer, the aromatic vinyl-based monomer, and the alkyl (meth)acrylate-based monomer. Thereamong, an amount of 0.5 to 1.2 parts by weight is preferred. Within these ranges, emulsion polymerization may be easily performed and a residual amount of an initiator in a graft copolymer may be minimized.

During the emulsion polymerization, a molecular weight regulator may be further added. The molecular weight regulator may be one or more selected from the group consisting of t-dodecyl mercaptan, N-dodecyl mercaptan, and an alpha-methylstyrene dimer. Thereamong, t-dodecyl mercaptan is preferred.

The molecular weight regulator may be added in an amount of 0.1 to 1.0 part by weight, 0.2 to 0.8 part by weight or 0.4 to 0.6 part by weight based on 100 parts by weight of the sum of the conjugated diene-based polymer, the aromatic vinyl-based monomer, and the alkyl (meth)acrylate-based monomer. Thereamong, an amount of 0.4 to 0.6 part by weight is preferred.

The emulsion polymerization may be initiated after feeding monomers and the like into a reactor batchwise, may be performed by feeding a portion of monomers and the like into a reactor before initiation of the emulsion polymerization and, after initiating the emulsion polymerization, continuously feeding the remainder of the monomers and the like into the reactor, or may be performed while continuously feeding monomers and the like into a reactor for a predetermined time.

(2) Coagulation

Next, an imidazole-based ionic compound is added to the graft copolymer latex, followed by coagulating the same.

The imidazole-based ionic compound, which is an ionic liquid, may be a salt consisting of a cation, present in a heterocycle, and a anion, present in an inorganic substance, may be present as a liquid at room temperature, and may be used as a solvent. Since the imidazole-based ionic compound may function as a coagulant as well as an antistatic agent, it is added in a coagulation process after completing the emulsion polymerization. Since the imidazole-based ionic compound is added in a coagulation process, an influence thereof on properties of a graft copolymer may be minimized, and the imidazole-based ionic compound may be more uniformly included in a graft copolymer. Accordingly, the antistatic property may be remarkably improved.

The imidazole-based ionic compound may be one or more selected from the group consisting of 1-butyl-3-methylimidazolium chloride, 1-hexyl-3-methylimidazolium chloride, 1-ethyl-3-methylimidazolium bromide, 1-ethyl-3-methyl-imidazolium hexafluorophosphate, 1-ethyl-3-methylimidazolium tetrafluoroborate, 1-ethyl-3-methylimidazolium trifluoromethanesulfonate, 1-ethyl-3-methylimidazolium bistrifluoromethanesulfonylimide, 1-ethyl-3-methylimidazolium methanesulfonate, 1-ethyl-3-methylimidazolium tosylate, 1-ethyl-3-methylimidazolium bis[salicylate(2)]borate, 1-ethyl-3-methylimidazolium cobalt tetracarbonyl, 1-butyl-3-methylimidazolium hexafluorophosphate, 1-butyl-3-methylimidazolium hexafluoroantimonate, 1-butyl-3-methylimidazolium tetrafluoroborate, 1-butyl-3-methylimidazolium trifluoromethanesulfonate, 1-butyl-3-methylimidazolium bistrifluoromethanesulfonylimide, 1-butyl-3-methylimidazolium methanesulfonate, 1-butyl-3-methylimidazolium tosylate, 1-butyl-3-methylimidazolium bis[salicylate(2)]borate, 1-butyl-3-methylimidazolium cobalt tetracarbonyl, 1-hexyl-3-methylimidazolium hexafluoroantimonate, 1-hexyl-3-methylimidazolium tetrafluoroborate, 1-hexyl-3-methylimidazolium trifluoromethanesulfonate, 1-hexyl-3-methylimidazolium bistrifluoromethane sulfonylimide, 1-hexyl-3-methylimidazolium methanesulfonate, 1-methyl-3-octyl imidazolium chloride, 1-methyl-3-octylimidazolium hexafluoroantimonate, 1-methyl-3-octylimidazolium tetrafluoroborate, 1-methyl-3-octylimidazolium trifluoromethanesulfonate, 1-methyl-3-octylimidazolium bistrifluoromethanesulfonylimide, 1-methyl-3-octylimidazolium methanesulfonate, 1-methyl-N-benzoylimidazolium chloride, 1-methyl-N-benzoylimidazolium hexafluorophosphate, 1-methyl-N-benzylimidazolium hexafluoroantimonate, 1-methyl-N-benzylimidazolium tetrafluoroborate, 1-methyl-N-benzylimidazolium trifluoromethanesulfonate, 1-methyl-N-benzylimidazolium trifluoromethanesulfonate, 1-methyl-N-benzylimidazolium bistrifluoromethanesulfonylimide, 1-methyl-N-benzylimidazolium methanesulfonate, 1-methyl-3-(3-phenylpropyl) imidazolium chloride, 1-methyl-3-(3-phenylpropyl) imidazolium hexafluorophosphate, 1-methyl-3-(3-phenylpropyl) imidazolium hexafluoroantimonate, 1-methyl-3-(3-phenylpropyl)imidazolium tetrafluoroborate, 1-methyl-3-(3-phenylpropyl)imidazolium trifluoromethanesulfonate, 1-methyl-3-(3-phenylpropyl)imidazolium bistrifluoromethanesulfonylimide, 1-methyl-3-(3-phenylpropyl) imidazolium methanesulfonate, 1-2,3-dimethylimidazolium chloride, 1-butyl-2,3-dimethylimidazolium hexafluorophosphate, 1-butyl-2,3-dimethylimidazolium hexafluoroantimonate, 1-butyl-2,3-dimethylimidazolium tetrafluoroborate, 1-butyl-2,3-dimethylimidazolium tetrafluoroborate, 1-butyl-2,3-dimethylimidazolium trifluoromethanesulfonate, 1-butyl-2,3-dimethylimidazolium bistrifluoromethanesulfonylimide, 1-butyl-2,3-dimethylimidazolium methanesulfonate, 1-ethyl-2,3-dimethylimidazolium chloride, 1-ethyl-2,3-dimethylimidazolium hexafluorophosphate, 1-ethyl-2,3-dimethylimidazolium hexafluoroantimonate, 1-ethyl-2,3-dimethylimidazolium tetrafluoroborate, 1-ethyl-2,3-dimethylimidazolium trifluoromethanesulfonate, 1-ethyl-2,3-dimethylimidazolium bistrifluoromethanesulfonylimide, and 1-ethyl-2,3-dimethylimidazolium methanesulfonate. Thereamong, one or more selected from the group consisting of 1-butyl-methylimidazolium chloride and 1-hexyl-3-methylimidazolium chloride is preferred.

The imidazole-based ionic compound may be added in an amount of 1 to 7 parts by weight, 2 to 6 parts by weight or 2 to 5 parts by weight based on 100 parts by weight of the graft copolymer latex. Thereamong, an amount of 2 to 5 parts by weight is preferred.

Within these ranges, the antistatic property may be improved without deterioration of the properties of a graft copolymer, i.e., a decrease in transparency, impact strength, and yellow index.

The coagulation may be performed at 93 to 97° C., 94 to 96° C. or 93 to 95° C. Thereamong, a temperature of 93 to 95° C. is preferred. The coagulation may be performed for 5 to 20 minutes, 7 to 20 minutes, or 10 to 20 minutes. Thereamong, a time of 10 to 20 minutes is preferred. Within these ranges, the coagulation may be easily performed, and non-coagulation may be minimized.

After the coagulation, an aging process may be further performed. The aging process may be performed at 95 to 100° C., 96 to 99° C., or 97 to 99° C. Thereamong, a temperature of 97 to 99° C. is preferred. The aging process may be performed for 10 to 30 minutes, 15 to 30 minutes, or 20 to 30 minutes. Thereamong, a time of 20 to 30 minutes is preferred. Within these ranges, the coagulation may be easily performed, and non-coagulation may be minimized. In addition, an apparent specific gravity and caking properties may be improved.

After completing the aging process, a dehydration and drying process may be further performed.

2. Graft Copolymer Complex

A graft copolymer complex according to another embodiment of the present invention includes a graft copolymer including a conjugated diene-based polymer and units derived from an aromatic vinyl-based monomer and units derived from an alkyl (meth)acrylate-based monomer graft-polymerized with the conjugated diene-based polymer; and a compound derived from an imidazole-based ionic compound.

Hereinafter, each component of the graft copolymer complex is described in detail.

The compound derived from the imidazole-based ionic compound may have a form wherein the imidazole-based ionic compound is adsorbed, in a state of being separated into cations and anions, to the graft copolymer.

The compound derived from the imidazole-based ionic compound may be included in an amount of 1 to 7 parts by weight, 2 to 6 parts by weight, or 2 to 5 parts by weight based on 100 parts by weight of the graft copolymer. Thereamong, an amount of 2 to 5 parts by weight is preferred.

Within these ranges, the antistatic property may be improved without deterioration of the properties of a graft copolymer, i.e., a decrease in transparency, impact strength, and yellow index.

Other descriptions of the compound derived from the imidazole-based ionic compound are the same as those of the imidazole-based ionic compound used in the method of preparing a graft copolymer complex described above.

The conjugated diene-based polymer included in the graft copolymer may be included in an amount of 20 to 70% by weight, 30 to 60% by weight, or 40 to 60% by weight based on a total weight of the graft copolymer. Thereamong, an amount of 40 to 60% by weight is preferred. Within these ranges, a thermoplastic resin, as a final product, may exhibit superior transparency.

The units derived from the aromatic vinyl-based monomer included in the graft copolymer may be included in an amount of 7 to 30% by weight, 10 to 30% by weight, or 10 to 20% by weight based on a total weight of the graft copolymer. Thereamong, an amount of 10 to 20% by weight is preferred. Within these ranges, a thermoplastic resin, as a final product, may exhibit superior impact resistance, processability, and transparency.

The units derived from the alkyl (meth)acrylate-based monomer included in the graft copolymer may be included in an amount of 20 to 60% by weight, 30 to 60% by weight, or 30 to 40% by weight based on a total weight of the graft copolymer. Thereamong, an amount of 30 to 40% by weight is preferred. Within these ranges, a thermoplastic resin composition, as a final product, may exhibit superior transparency.

The graft copolymer may be in a state wherein units derived from an α,β-unsaturated nitrile-based monomer is further graft-polymerized onto a conjugated diene-based polymer.

The units derived from the α,β-unsaturated nitrile-based monomer may be included in an amount of 10 parts by weight or less, 1 to 10 parts by weight, 2 to 7 parts by weight, or 2 to 5 parts by weight based on 100 parts by weight of the sum of the conjugated diene-based copolymer, the units derived from the aromatic vinyl-based monomer, and the units derived from the alkyl (meth)acrylate-based monomer. Thereamong, an amount of 2 to 5 parts by weight is preferred. Within these ranges, the transparency of a final product is not affected.

Other descriptions of the graft copolymer are the same as those of the method of preparing a graft copolymer complex described above.

3. Thermoplastic Resin Composition

A thermoplastic resin composition according to still another embodiment of the present invention includes the graft copolymer complex according to another embodiment of the present invention and a copolymer including units derived from an alkyl (meth)acrylate, units derived from an aromatic vinyl-based monomer, and units derived from an α,β-unsaturated nitrile-based monomer.

Hereinafter, each component of the thermoplastic resin composition is described in detail.

Description of the graft copolymer complex is the same as that of "2. Graft copolymer complex".

The copolymer may be a copolymer wherein an alkyl (meth)acrylate-based monomer, an aromatic vinyl-based monomer, and an α,β-unsaturated nitrile-based monomer are copolymerized.

The units derived from the alkyl (meth)acrylate-based monomer in the copolymer may be included in an amount of 50 to 80% by weight or 55 to 75% by weight based on a total weight of the copolymer. Thereamong, an amount of 55 to 75% by weight is preferred. Within these ranges, a thermoplastic resin composition, as a final product, may exhibit superior transparency.

The units derived from the aromatic vinyl-based monomer in the copolymer may be included in an amount of 15 to 40% by weight or 15 to 35% by weight based on a total weight of the copolymer. Thereamong, an amount of 15 to 35% by weight is preferred. Within these ranges, a thermoplastic resin, as a final product, may exhibit superior impact resistance, processability, and transparency.

The units derived from the α,β-unsaturated nitrile-based monomer in the copolymer may be included in an amount of 1 to 15% by weight or 1 to 10% by weight based on a total weight of the copolymer. Thereamong, an amount of 1 to 10% by weight is preferred. Within these ranges, the transparency of a final product is not affected.

The copolymer may further include units derived from a (meth)acrylic acid. The units derived from the (meth)acrylic acid may be included in an amount of 10% by weight or less, 1 to 10% by weight, or 1 to 5% by weight based on a total weight of the copolymer. Thereamong, an amount of 1 to 5% by weight is preferred. Within these ranges, impact strength is improved.

A weight ratio of the graft copolymer complex to the copolymer may be 1:9 to 5:5, 1:9 to 2:8 or 2:8 to 3:7. Thereamong, a weight ratio of 2:8 to 3:7 is preferred. Within these ranges, a thermoplastic resin composition having excellent antistatic performance, transparency, impact strength, and an excellent yellow index may be prepared.

The thermoplastic resin composition may include one or more additives selected from the group consisting of a heat stabilizer, a UV stabilizer, and a lubricant. The resin composition may be uniformly dispersed and mixed using a single-screw extruder, a twin-screw extruder, or the like, and then passed through a water bath and cut, thereby being prepared into a pellet-shaped transparent resin.

MODE FOR CARRYING OUT THE INVENTION

Now, exemplary embodiments of the present invention will be described in detail so that those skilled in the art can easily carry out the present invention. However, the present invention may be implemented in various different forms and is not limited to these embodiments.

Graft Copolymer Complex Preparation

Examples 1 to 5 and Comparative Example 1

50 parts by weight of a polybutadiene latex polymer (insoluble gel content: 90%, average particle diameter 0.15 μm), 100 parts by weight of ion-exchanged water, 1.0 part by weight of sodium dodecyl benzene sulfonate as an emulsifier, 35 parts by weight of methyl methacrylate, 11.9 parts by weight of styrene, 3 parts by weight of acrylonitrile, 0.5 part by weight of t-dodecyl mercaptan as a molecular weight regulator, 0.048 part by weight of sodium formaldehyde sulfoxylate as an activator, 0.015 part by weight of sodium ethylenediaminetetraacetic acid, 0.001 part by weight of ferrous sulfate, and 0.04 part by weight of cumene hydroperoxide as an initiator were continuously added into a reactor set at 75° C. a reactor for 3 hours, and a reaction was allowed to proceed. After completing the reaction, the temperature was elevated to 80° C., and then aging was performed for 1 hour, followed by terminating the reaction. As a result, a graft copolymer latex was obtained.

Next, a coagulant summarized in Table 1 below was added to 100 parts by weight of the obtained graft copolymer latex, and a latex was coagulated at 95° C. for 10 minutes. Aging was performed at 99° C. for 30 minutes, followed by washing, dehydrating, and drying. As a result, a powdery graft copolymer complex was obtained.

TABLE 1

| | Coagulant | |
|---|---|---|
| Classification | 1-butyl-3-methylimidazolium chloride (parts by weight) | Calcium chloride (parts by weight) |
| Example 1 | 1.0 | — |
| Example 2 | 2.0 | — |
| Example 3 | 3.0 | — |
| Example 4 | 5.0 | — |
| Example 5 | 7.0 | — |
| Comparative Example 1 | — | 2.0 |

Comparative Example 2

A graft copolymer latex was obtained in the same manner as in Example 1. 2.0 parts by weight of sulfuric acid as a coagulant were added to 100 parts by weight of the obtained graft copolymer latex, and the latex was coagulated at 92° C. for 10 minutes. The coagulated latex was neutralized to pH7 with potassium chloride, aged at 99° C. for 10 minutes, washed, and dehydrated, thereby obtaining a powdery copolymer.

Copolymer Preparation

Preparation Example 1

A material prepared by mixing 68 parts by weight of methylmethacrylate, 22 parts by weight of styrene, 7 parts by weight of acrylonitrile, 3 parts by weight of methacrylic acid, 30 parts by weight of toluene as a solvent, and 0.15 part by weight of t-dodecyl mercaptan as a molecular weight regulator was continuously fed into a reactor such that an average reaction time was 3 hours, and a reaction temperature was maintained at 148° C. A polymerized solution discharged from the reactor was heated in a preliminary heating tank, and unreacted monomers were volatilized in a volatilization tank. Next, the temperature was maintained at 210° C. and a pellet-shaped MSAN copolymer was prepared using a polymer transfer pump extrusion machine.

Thermoplastic Resin Composition Preparation

Examples 6 to 10 and Comparative Examples 3 to 7

Components summarized in Table 2 below were mixed, and a pellet-shaped thermoplastic resin composition was prepared using a twin-screw extruder in a cylinder, the temperature of which was changed gradually from 200° C. to 220° C.

TABLE 2

| | Graft copolymer complex | | Copolymer of Preparation | Polyether-ester-amide | 1-butyl-3-methyl imidazolium chloride |
|---|---|---|---|---|---|
| Classification | Type | Content (parts by weight) | Example 1 (parts by weight) | copolymer (parts by weight) | (parts by weight) |
| Example 6 | Example 1 | 30 | 70 | — | — |
| Example 7 | Example 2 | 30 | 70 | — | — |
| Example 8 | Example 3 | 30 | 70 | — | — |
| Example 9 | Example 4 | 30 | 70 | — | — |
| Example 10 | Example 5 | 30 | 70 | — | — |
| Comparative Example 3 | Comparative Example 1 | 30 | 70 | — | — |
| Comparative Example 4 | Comparative Example 1 | 30 | 70 | 15 | — |
| Comparative Example 5 | Comparative Example 1 | 30 | 70 | — | 2 |
| Comparative Example 6 | Comparative Example 2 | 30 | 70 | — | — |
| Comparative Example 7 | Comparative Example 2 | 30 | 70 | — | 2 |

※ Polyether-ester-amide copolymer (product name: Pellestat-6500, manufacturer: Sanyo Chemical)

Experimental Example 1

Transparency, impact strength, yellow indexes, and surface resistance values of the thermoplastic resin compositions of Examples 6 to 10 and Comparative Examples 3 to 7 were measured. Results are summarized in Table 3 below.

1) Transparency (haze): Measured according to ASTM 1003.

2) Impact strength (kg·cm/cm): A thermoplastic resin composition was injection-molded to a thickness of ¼ inch, and the impact strength thereof was measured according to ASTM D256-10.

3) Yellow index: Color data was measured according to ASTM D6290.

4) Surface resistance value ($\Omega$): A voltage of 250 V was applied to a specimen, manufactured by injection-molding a thermoplastic resin composition using a VMG-1000 High-megohm meter (Ando) under conditions of 23° C. and 50% RH, for 1 minute to measure a surface resistance value thereof. A smaller surface resistance value indicates a superior antistatic property.

TABLE 3

| Classification | Transparency (%) | Impact strength (kg·cm/cm) | Yellow index | Surface resistance value ($\Omega$) |
|---|---|---|---|---|
| Example 6 | 2.0 | 14.5 | 0.45 | $3.0 \times 10^{13}$ |
| Example 7 | 2.0 | 14.3 | 0.45 | $5.6 \times 10^{10}$ |
| Example 8 | 2.1 | 14.2 | 0.44 | $4.3 \times 10^{9}$ |
| Example 9 | 2.1 | 14.0 | 0.50 | $3.3 \times 10^{9}$ |
| Example 10 | 3.0 | 14.6 | 0.75 | $1.2 \times 10^{9}$ |
| Comparative Example 3 | 1.8 | 14.5 | 0.43 | $4.4 \times 10^{16}$ |
| Comparative Example 4 | 10.3 | 17.8 | 11.51 | $1.1 \times 10^{9}$ |
| Comparative Example 5 | 2.0 | 14.4 | 2.22 | $6.6 \times 10^{11}$ |
| Comparative Example 6 | 2.0 | 14.4 | 2.20 | $6.7 \times 10^{15}$ |
| Comparative Example 7 | 2.1 | 14.3 | 4.88 | $5.5 \times 10^{11}$ |

Referring to Table 3, it can be confirmed that, in the case of Examples 6 to 10 using 1-butyl-3-methylimidazolium as a coagulant, transparency, impact strength, a yellow index, and a surface resistance value are all excellent. In particular, it can be confirmed that, when 1-butyl-3-methylimidazolium, as a coagulant, is added in an amount of 2 to 5 parts by weight based on 100 parts by weight of the latex as in Examples 7 to 9, a surface resistance value is remarkably increased, and transparency, impact strength, and a yellow index are all excellent.

It can be confirmed that, in the case of Comparative Example 3 using calcium chloride as a coagulant of a copolymer latex, transparency, impact strength and a yellow index are excellent, but an antistatic property is poor due to a high surface resistance value. In addition, it can be confirmed that, in the case of the composition of Comparative Example 4 prepared by further adding a polyether-ester-amide copolymer, as a generally used antistatic agent, to the composition of Comparative Example 3, a surface resistance value is remarkably improved, but transparency and a yellow index are remarkably increased. In addition, it can be confirmed that, in the case of the composition of Comparative Example 5 prepared by further adding 1-butyl-3-methylimidazolium to the composition of Comparative Example 3, an antistatic property is remarkably decreased, compared to Example 7, although the amount of the 1-butyl-3-methylimidazolium is the same as that in Example 7.

In the case of Comparative Example 6 using sulfuric acid as a coagulant of a copolymer latex, a surface resistance value is high, and a yellow index increases due to decreased thermal stability. Accordingly, Comparative Example 6 is not preferable. In addition, in the case of the composition of Comparative Example 7 prepared by further adding 1-butyl-3-methylimidazolium to the composition of Comparative Example 6, an antistatic property is remarkably decreased, compared to Example 7, and a yellow index is high although the amount of the 1-butyl-3-methylimidazolium is the same as that of Example 2. Accordingly, Comparative Example 7 is not preferable.

The invention claimed is:

1. A method for preparing a graft copolymer complex, the method comprising:
   emulsion-polymerizing a conjugated diene-based polymer, an aromatic vinyl-based monomer, and an alkyl (meth)acrylate-based monomer to prepare a graft copolymer latex; and
   adding an imidazole-based ionic compound to the graft copolymer latex and coagulating the same,
   wherein the imidazole-based ionic compound is added in an amount of 1.0 to 7.0 parts by weight based on 100 parts by weight of the graft copolymer latex.

2. The method of claim 1, wherein the imidazole-based ionic compound is added in an amount of 2.0 to 5.0 parts by weight based on 100 parts by weight of the graft copolymer latex.

3. The method of 1, wherein the imidazole-based ionic compound is one or more selected from the group consisting of 1-butyl-3-methylimidazolium chloride and 1-hexyl-3-methylimidazolium chloride.

4. The method of claim 1, wherein the coagulation is performed at 93 to 97° C. for 5 to 20 minutes.

5. The method of claim 1, wherein, after the coagulation, an aging process is further performed at 95 to 100° C. for 10 to 30 minutes.

6. The method of claim 1, wherein 20 to 70% by weight of the conjugated diene-based polymer, 7 to 30% by weight of the aromatic vinyl-based monomer, and 20 to 60% by weight of the alkyl (meth)acrylate-based monomer are emulsion-polymerized based on a total weight of the conjugated diene-based polymer and the monomers.

7. The method of claim 1, wherein, during the emulsion polymerization, an α,β-unsaturated nitrile-based monomer is further added.

8. A graft copolymer complex, comprising:
   a graft copolymer comprising a conjugated diene-based polymer and units derived from an aromatic vinyl-based monomer and units derived from an alkyl (meth)acrylate-based monomer graft-polymerized with the conjugated diene-based polymer; and
   a compound derived from an imidazole-based ionic compound,
   wherein the compound derived from the imidazole-based ionic compound is present in an amount of 1 to 7 parts by weight based on 100 parts by weight of the graft copolymer.

9. The graft copolymer complex of claim 8, wherein the compound derived from the imidazole-based ionic compound is present in an amount of 2.0 to 5.0 parts by weight based on 100 parts by weight of the graft copolymer.

10. The graft copolymer complex of claim 8, wherein the compound derived from the imidazole-based ionic compound is derived from one or more selected from the group consisting of 1-butyl-3-methylimidazolium chloride and 1-hexyl-3-methylimidazolium chloride.

11. The graft copolymer complex of claim 8, wherein 20 to 70% by weight of the conjugated diene-based polymer, 7 to 30% by weight of units derived from the aromatic vinyl-based monomer and 20 to 60% by weight of units derived from the alkyl (meth)acrylate-based monomer are comprised based on a total weight of the graft polymer.

12. The graft copolymer complex of claim 8, wherein units derived from an α,β-unsaturated nitrile-based monomer is further graft-copolymerized onto the conjugated diene-based polymer.

13. A thermoplastic resin composition, comprising the graft copolymer complex according to claim 8; and a copolymer comprising units derived from an alkyl (meth) acrylate, units derived from an aromatic vinyl-based monomer, and units derived from an α,β-unsaturated nitrile-based monomer.

14. A method for preparing a graft copolymer complex, the method comprising:
   emulsion-polymerizing a conjugated diene-based polymer, an aromatic vinyl-based monomer, and an alkyl (meth)acrylate-based monomer to prepare a graft copolymer latex; and
   adding an imidazole-based ionic compound to the graft copolymer latex and coagulating the same,
   wherein the coagulation is performed at 93 to 97° C. for 5 to 20 minutes.

* * * * *